July 26, 1938.  J. F. SHEPARD  2,124,898
PLURAL PRESS CONTROL
Filed Jan. 11, 1936  2 Sheets-Sheet 1

INVENTOR
JAMES F. SHEPARD
BY
Brockett, Hyde, Higley + Meyer
ATTORNEYS

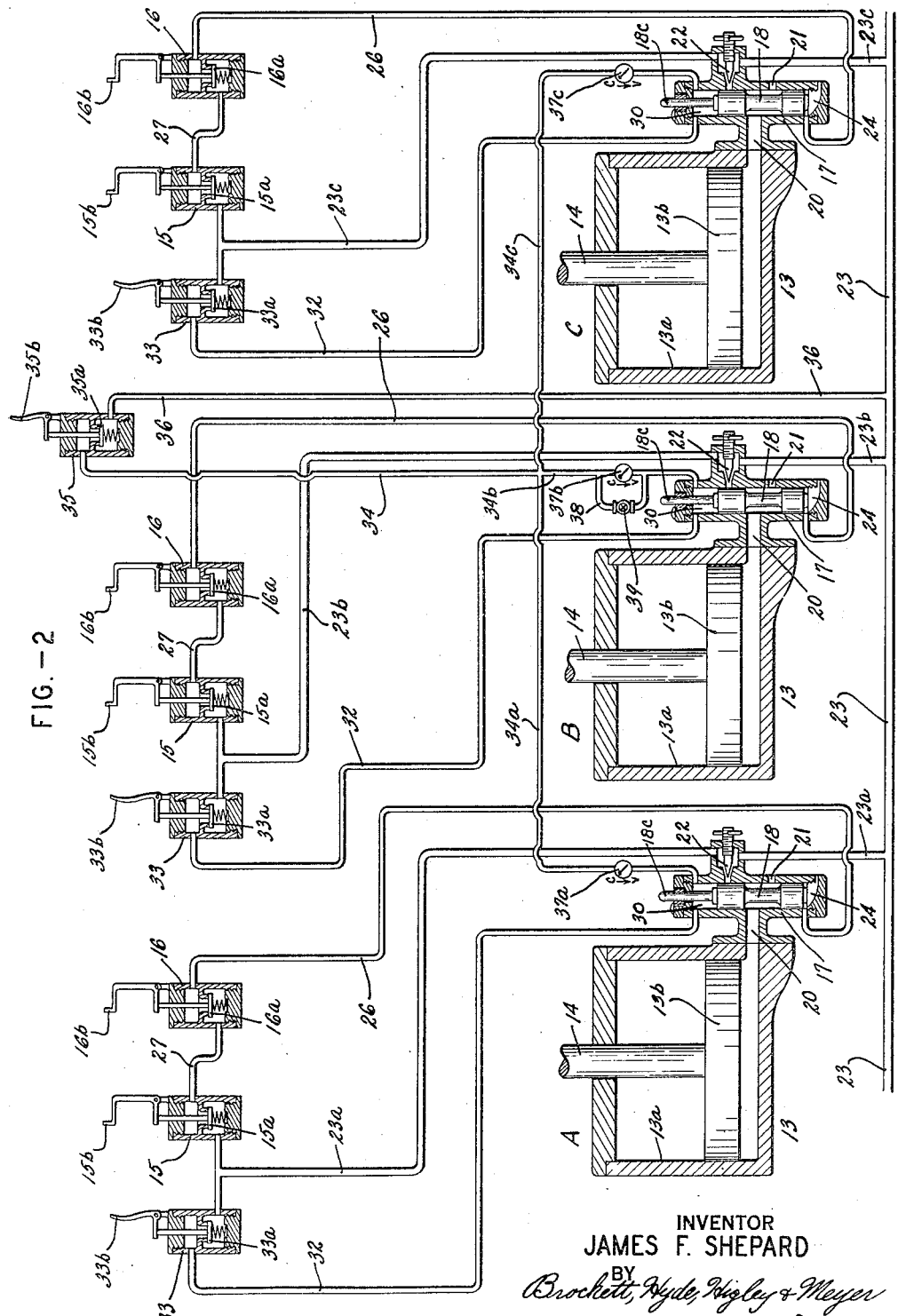

Patented July 26, 1938

2,124,898

UNITED STATES PATENT OFFICE 2,124,898

PLURAL PRESS CONTROL

James F. Shepard, Rochester, N. Y., assignor to The American Laundry Machinery Company, Norwood, Ohio, a corporation of Ohio Application January 11, 1936, Serial No. 58,692

14 Claims. (Cl. 38—5)

This invention relates to improvements in control mechanism for a plurality of grouped pressing machines.

An object of the present invention is the provision in a group of pressing machines, each of which is power operated, of control means individual to each press for closing the same and a novel control means adapted upon the actuation of a single control member to cause opening of all the machines in the group.

Another object of the present invention is the provision in a group of pressing machines, each of which is power operated, of control means individual to each press for closing and opening the same and a novel control means adapted upon the actuation of a selected single control member to cause opening of all of the machines in the group.

Another object of the present invention is the provision in a group of pressing machines, each of which is provided with operating means, of means individual to each press for closing the same, means individual to some of said presses for opening the same, and a single control member adapted to cause opening of all of the machines in the group.

Another feature of the present invention is the provision in a group of pressing machines of individual closing means for each press, power means for causing opening of each press, and a single control member for causing conjoint operation of all the power means.

Another feature of the present invention is the provision in a group of pressing machines each having power means for opening and closing the same of a control means at each press movable into press-opening-producing and press-closing-producing positions, and two power devices at each press, one for moving the control means thereof into each of its two positions respectively, means individual to each press for actuating the press-closing-producing device, and means common to all of the presses for causing conjoint operation of the press-opening-producing devices.

Other objects of the invention include novel structure of control members for carrying out the above described objects and the special arrangement of the operating parts as will more clearly appear in the accompanying drawings and specification, and the essential features of which will be set forth in the claims.

Figure 3:
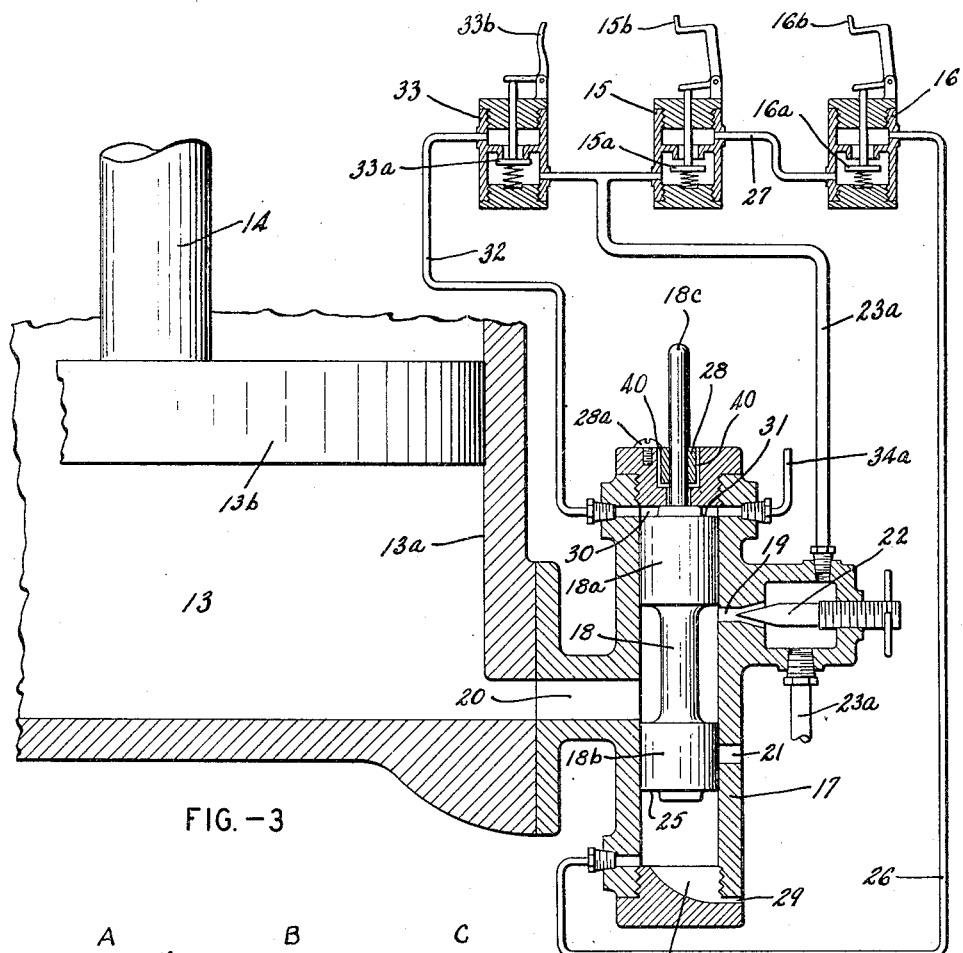
Figure 1:
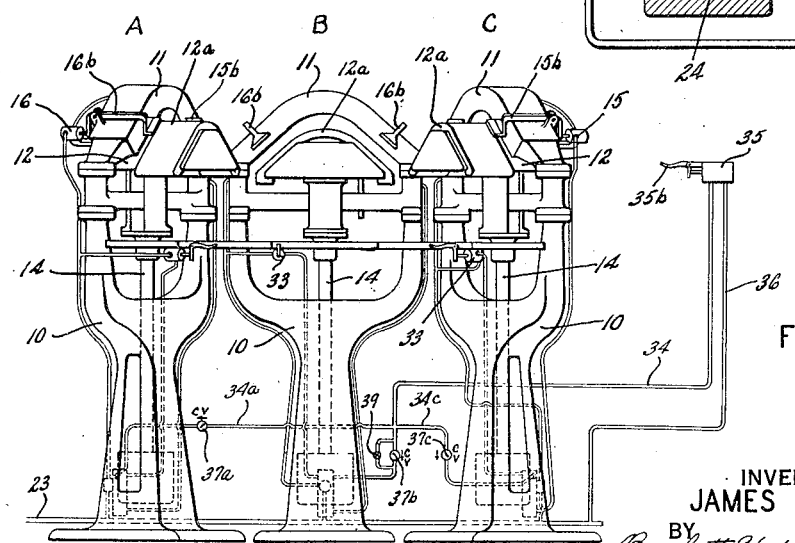

In the drawings, Fig. 1 is an elevation showing three pressing machines grouped for operation by my novel control mechanism; Fig. 2 is a general diagrammatic view of a portion of the operating mechanism of each of three pressing machines together with the control mechanism therefor; while Fig. 3 is an enlarged diagrammatic view of a portion of one of the machines shown diagrammatically in Fig. 2.

My invention is applicable to pressing machines in various arrangements but I have chosen to describe the same as applied to a common grouping of machines such as is found in the laundry industry, namely, the grouping of three pressing machines to operate simultaneously upon a single garment, such as a man's shirt. Such a group as shown in Fig. 1 comprises presses A and C, each of which is adapted to press a cuff of a man's shirt and the intermediately located press B which is arranged to press or iron the collar or neckband of the same shirt. In operating such a group of presses the operator arranges the collar or neckband of the shirt on press B and then closes this press. She then takes one of the cuffs and arranges the same on one of the other presses, for instance, press A, and closes that press. She then arranges the cuff on press C and closes that press and upon completion of the pressing operation it is desirable to open all of the presses at once. My present invention involves a novel arrangement of control mechanism for accomplishing this result.

Each of the machines illustrated in Fig. 1 is similar to that illustrated, described and claimed in Patent No. 1,925,591, granted September 5, 1933 to O. W. Johnson. In such a machine a frame 10 supports a fixed pressing head 11 which is generally heated in a manner well known to this art, a coacting pressing bed 12 is vertically movable toward and from the head and a work carrying slide 12a is arranged to slide into and out of registration beneath the pressing head. In the out-of-registration position work is arranged upon the slide which is then moved by hand into registering position and power is applied beneath the bed to raise the same to move the work on the slide into pressing engagement with the head. In the press shown, power is applied through a cylinder and piston motor 13 mounted in the lower portion of the frame and having a movable member, in the present instance the piston rod 14, which extends upwardly and has an operative connection with the bed 12 for lifting the same into pressure engagement with the head when motive fluid is supplied to motor 13. The supply of motive fluid is controlled by a pair of valves in casings 15 and 16 controlling the supply of motive fluid to motor 13 in such a manner that both of the valves must be actuated conjointly to effectively supply fluid to the motor 13. In the form of press illustrated these valves comprise two inlet valves in series having actuators 15b and 16b arranged at the front of the machine in position to be actuated one by each hand of the operator as she moves the slide into registration and holds it there. It is thought further description of this machine is unnecessary as the type is well known in the art and the invention herein relates to the control means therefor which is diagrammatically shown in Fig. 2.

In this diagram only the motor 13 of each press is illustrated for the purposes of explaining the control mechanism applied thereto. Each of these motors comprises a cylinder 13a housing a piston 13b whose piston rod 14 is arranged to lift the pressing bed of each machine in a manner just described. The supply of motive fluid to cylinder 13a is by way of a valve casing 17 which houses a valve 18 movable into two positions for the supply and exhaust of motive fluid to motor 13 respectively. In the present form the valve 18 is a balanced piston valve having pistons 18a and 18b connected together by a recessed portion of the valve adapted in its upper position to provide communication between inlet port 19 and port 20 leading to cylinder 13a. This is the position shown in Fig. 3. In its lower position the piston valve provides communication between port 20 and the exhaust port 21. This is the position shown in Fig. 2. The flow of fluid to the motor may be adjusted by a needle valve 22 if desired. The supply of motive fluid for each of the motors 13 is by way of a main supply conduit 23 and branch conduits 23a, b, and c, respectively.

Means is provided individual to each press for moving each of the valves 18 into its upper or press-closing-producing position so that after the operator has arranged the lay of the work at each press individually she may close the same. By the present invention I provide a power device for moving each of the valves 18 to its lower or press-opening-producing position, with a common power supply for all of these devices and a single control member for supplying power to all of the press-opening-producing devices conjointly.

In the present instance I also provide a power device at each press for moving the valve 18 thereof into its upper or press-closing-producing position but it will be understood that my invention may be utilized without this type of power device. In the present instance the power device for moving each valve 18 into its uppermost position is provided by building the lower portion of the valve casing 17 in such a manner that the lower end of the casing provides a chamber 24 into which motive fluid may be introduced to act upon the lower face 25 of the piston 18b, thus acting as a servo-motor to lift the valve 18. Motive fluid is supplied to this servo-motor through a conduit 26 which receives motive fluid from one of the conduits 23a, b, or c by way of valve casings 15 and 16. Each of these casings houses a normally closed inlet valve 15a, 16a, which is operable by a manual 15b or 16b, these manuals preferably being arranged in the manner shown in Fig. 1 although other arrangements of the manuals will be understood to be suitable to provide safe operation. A small leak port 29 is provided in the lowermost end of valve casing 17 to evacuate the chamber 24 when the lower servo-motor has performed its function.

The power device at each press for moving the valve 18 thereof into its lowermost position is provided in a manner similar to that just described, namely, by arranging the upper portion of valve casing 17 to provide a chamber 30 wherein motive fluid may be introduced against the upper outwardly exposed face 31 of piston 18a thus providing a servo-motor in this location. It will be understood that other arrangements of power devices for producing downward movement of valve 18 are included in my present invention, the structure here shown being merely a novel arrangement which reduces the number of necessary parts. Motive fluid is supplied to chamber 30 by means individual to each press and also by means common to all three presses. The means individual to each press comprises a conduit 32 communicating by valve casing 33 with the supply conduits 25a, b, and c, respectively. Valve casing 33 houses a normally closed inlet valve 33a operable by a release manual 33b.

The means common to all three presses for introducing motive fluid to the chambers 30 of the press-opening-producing servo-motors comprises conduits 34a, 34b, and 34c, respectively, which communicate by a common conduit 34 and valve casing 35 with a supply conduit 36. Casing 35 houses a normally closed inlet valve 35a operable by a manual 35b. In actual practice the control valve 35 or the common operating member 35b may be located at one of the presses A, B, or C or at some remote point. In a shirt pressing line the group of machines shown in Fig. 1 is often combined with a machine for pressing the body of the shirt and the operator sometimes operates those machines together, that is to say, she presses the body of a shirt on the body pressing machine while simultaneously pressing the collar and cuffs of another shirt on such a group of machines as shown in Fig. 1. In such an arrangement it may be desirable after closing the shirt body pressing machine to proceed to the group of machines shown in Fig. 1 to remove the shirt parts being pressed there. In such a case the control member 35b may be arranged adjacent the shirt body pressing machine so that it may be there actuated and the machines A, B and C shown in Fig. 1 will then be opened for the operator when she arrives at the group of collar and cuff pressing machines.

In conduits 34a, b, and c are check valves 37a, b, and c, respectively, to permit fluid flow only in the direction shown by the arrows. In conduit 34b is a by-pass 38 around check valve 37b. This by-pass may be opened or closed by a valve 39 for producing the desired operating circuits.

The operation of a group of machines like that above described, with valve 39 closed, is as follows: With the presses A, B, and C of Fig. 1 in open position, the valve 18 of each press will be in its lowermost position as shown in Fig. 2. The operator then arranges the collar or neckbank of a shirt upon the slide 12a of press B, moves the slide manually into registration beneath its pressing head and actuates manuals 15b and 16b. This supplies motive fluid from conduit 23b through valve 15a connecting conduit 27, valve 16a and conduit 26 to chamber 24. This lifts valve 18 to the position of Fig. 3, whereupon motive fluid flows through conduit 23b, port 19, valve casing 17 and port 20 to motor 13 of press B causing an upward stroke of the piston and piston rod and closing the press. The operator may then release the manuals 15b and 16b and the press will remain closed because the piston valve 18 will remain in any position in which it is placed. To aid in holding the piston valve in its various positions a stem 18c extends upwardly through the end of casing 17 and snugly fits within a friction sleeve 28 which is held in position by a screw 28a. Upon the closing of valves 15a and 16a, fluid is exhausted from conduit 26 and chamber 24 through leak port 29. The same operations are then carried out at presses A and C, thus closing all of the presses of the group. Any one of the presses may be opened by actuation of its release manual 33b or all of the presses may be opened conjointly by actuation of manual 35b. In either case motive fluid is supplied to chamber 30 to drive the valve 18 to its lowermost position as shown in Fig. 2 which causes exhaust of motive fluid from motor 13 and permits the press to open as gravity and the weight of the parts cause the piston 13b to move downwardly, lowering the bed out of contact with the head, and spring means not shown herein but illustrated in the above mentioned Johnson patent moves the slide out of registration. After such a press opening operation any fluid trapped in the chamber 30 and connected conduits is dissipated out of the leak ports 40 arranged in the upper end of valve casing 17.

The operation of the group of machines with valve 39 open is as follows: Each of the presses may be closed by actuation of manuals 15b and 16b thereof as previously described. Presses A and C may be opened by actuation of manual 33b thereof in the manner previously described. It will be noted that in the release of either press A or C, fluid is supplied through conduit 23a, valve 33a and conduit 32 to chamber 30 where the pressure above piston 18a moves the piston valve 18 to its lowermost or press-release-producing position. In such an operation the check valves 37a and 37c prevent any flow of release fluid beyond the points where it is applied, as just stated. However, with by-pass 38 open because of the opening of valve 39, release operation of press B will simultaneously cause release of presses A and C as follows: Motive fluid will be supplied through conduit 23b, valve 33a of press B and conduit 32 of press B to the chamber 30 of press B, causing downward movement of the piston valve 18 of press B and therefore causing release of that press. In addition, pressure fluid will flow beyond chamber 30 of press B through conduit 34b by way of by-pass 38 and open valve 39 and thence through conduit 34a and check valve 37a to chamber 30 of press A causing press release there and simultaneously fluid flows through conduit 34c and check valve 37c to chamber 30 of press C and causes press release there. This operation is desirable in a group of presses such as that described entirely separate from any idea of remote control from a single control member. For instance, a group of three presses comprising a central collar or neckband press B and adjacent presses A and C for ironing cuffs may be operated in this manner. A collar or neckband is placed on the reciprocating slide of press B, is then moved into registration and the press is closed. Next a cuff is placed on the slide of one of the end presses, say for example press A and this press is closed. After a few seconds the operator releases press A, opening that press without effect on press B, whereupon she reverses the cuff and again closes the press to iron the other side of the cuff. The operator then moves to press C where she performs the same operations to press both sides of a cuff there. After a given time she returns to press B and operates the release manual 33b of that press which causes the release of all of the presses in the group. Therefore, with this control arrangement, presses A and C may be released individually without effect on press B, but release of press B produces a release effect upon all of the presses.

What I claim is:

1. In combination, a plurality of presses each having coacting relatively movable pressing members, power means at each press for causing relative movement of the pressing members thereof into and out of engagement, means for causing into-engagement operation of each power means, power actuated means one for controlling out-of-engagement operation of each power means, and means for causing conjoint operation of a plurality of said last named means.

2. In combination, a plurality of presses each having coacting relatively movable pressing members, power means at each press for causing relative movement of the pressing members thereof into and out of engagement, a control member for each power means having press-closing- and press-opening-producing positions, means for moving each control member into press-closing-producing position, individual means for moving each control member into press-opening-producing position, and means for causing conjoint operation of a plurality of said last named means.

3. In combination, a plurality of presses each having coacting relatively movable pressing members, power means at each press for causing relative movement of the pressing members thereof into and out of engagement, means for causing into-engagement operation of each power means, power actuated means one for controlling out-of-engagement operation of each power means, a power supply circuit common to a plurality of said last named means, and a single control member for said power supply circuit.

4. In combination, a plurality of presses each having coacting relatively movable pressing members, power means at each press for causing relative movement of the pressing members thereof into and out of engagement, means for causing into-engagement operation of each power means, power actuated means one for controlling out-of-engagement operation of each power means, a power supply circuit common to a plurality of said last named means, and a single control member for said power supply circuit located at a point remote from said presses.

5. In combination, a plurality of presses each having coacting relatively movable pressing members, power means at each press for causing relative movement of the pressing members thereof into and out of engagement, a control member for each power means having press-closing- and press-opening-producing positions, means for moving each control member into press-closing-producing position, individual means for moving each control member into press-opening-producing position, a power supply circuit common to a plurality of said last named means, and a single control member for said power supply circuit.

6. In combination, a plurality of presses each having coacting relatively movable pressing members, power means at each press for causing relative movement of the pressing members thereof into and out of engagement, a control member for each power means having press-closing- and press-opening-producing positions, power actuated means for moving each control member, one means for moving said member in press-opening direction and another means for moving said member in press-closing direction, control means individual to each press for energizing said means, and control means for conjointly energizing all of said press-opening means.

7. In combination, two presses adapted to press the cuffs of a shirt, a press adapted to press the collar or neckband of a shirt, said presses being grouped to operate on said portions of one shirt simultaneously, means individual to each press for closing and opening the same, a power actuated means at each press for controlling opening of that press, and means including a single control member for conjointly energizing all of said power actuated means.

8. In combination, a plurality of presses each having coacting relatively movable pressing members, fluid motor means at each press for closing and opening the same, fluid supply means for each motor means including a balanced piston valve adapted to stay in any position in which it is placed, said piston valve having fluid-supply and fluid-exhaust positions, a power actuated device for each piston valve for moving the same to fluid-exhaust position, and means for simultaneously energizing all of said power actuated devices.

9. In combination, a plurality of presses each having coacting relatively movable pressing members, fluid motor means at each press for closing and opening the same, fluid supply means for each motor means including a balanced piston valve adapted to stay in any position in which it is placed, said piston valve having fluid-supply and fluid-exhaust positions, power actuated means individual to each piston valve for moving the same into fluid supply and exhaust positions, control means individual to each power actuated means and operable from the associated press, and control means common to a plurality of said power actuated means for causing conjoint operation of said power actuated means in fluid-exhaust-producing direction.

10. In combination, a plurality of presses each having coacting relatively movable pressing members, fluid motor means at each press for closing and opening the same, fluid supply means for each motor means including a balanced piston valve adapted to stay in any position in which it is placed, each of said piston valves having a casing and interconnected pistons reciprocable therein, fluid supply and exhaust connections through each casing established by reciprocation of said piston valves, means for supplying fluid in each casing to the opposite outwardly facing ends of said pistons to reciprocate said piston valves, control means for said last-named means individual to each press, and control means operable from a single station for supplying fluid conjointly to that end of each piston valve which causes valve movement into fluid-exhaust position.

11. In combination, a plurality of presses each having coacting relatively movable pressing members, power means at each press for causing relative movement of the pressing members thereof into and out of engagement, control means for each power means having press-closing- and press-opening-producing positions, power actuated means for each control means and individually operable for moving it into each of its two positions respectively, control members individual to each press for supplying power to each power actuated means for actuating it in press-closing-producing direction, and a control member common to all of said presses for supplying power to said power actuated means for actuating them in press-opening-producing direction.

12. In combination, a plurality of presses each having coacting relatively movable pressing members, power means at each press for causing relative movement of the pressing members thereof into and out of engagement, control means for each power means having press-closing- and press-opening-producing positions, power actuated means for each control means and individually operable for moving it into each of its two positions respectively, control members individual to each press for supplying power to each power actuated means, and a control member common to all of said presses for supplying power to said power actuated means for actuating them in press-opening-producing direction.

13. In combination, a group of at least three presses each having coacting relatively movable pressing members, operating means for each press for causing relative movement of the pressing members thereof to close and open the press, control means individual to each press for closing and opening the same, and means whereby a control means at one of said presses causes opening movement of all of said presses.

14. In combination, a group of at least three presses each having coacting relatively movable pressing members, operating means for each press for causing relative movement of the pressing members thereof to close and open the press, means individual to each press for closing the same, means individual to some of said presses for opening the same, and a single control member adapted to cause opening of all of the machines in the group.

JAMES F. SHEPARD.